United States Patent Office 3,717,189
Patented Feb. 20, 1973

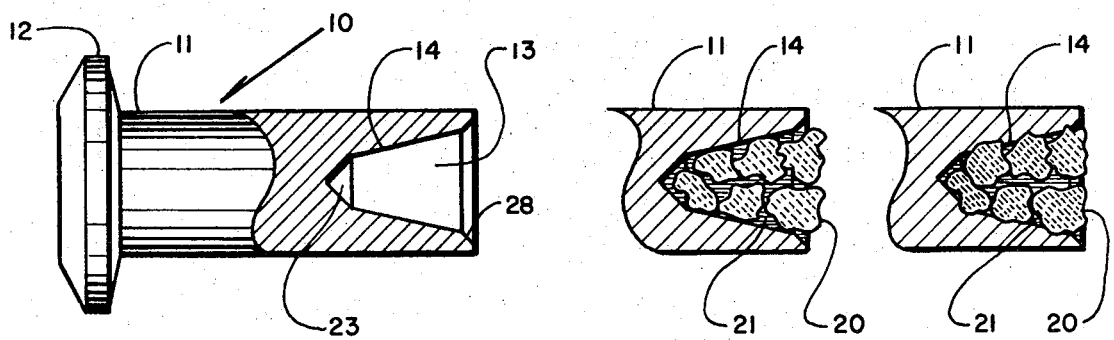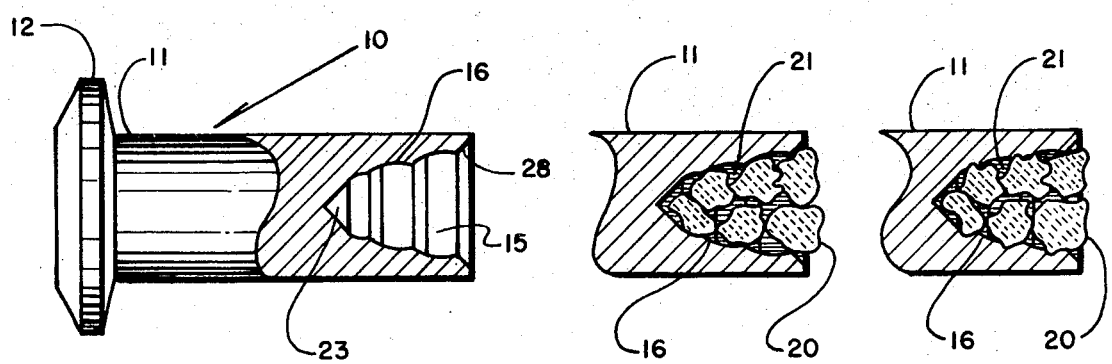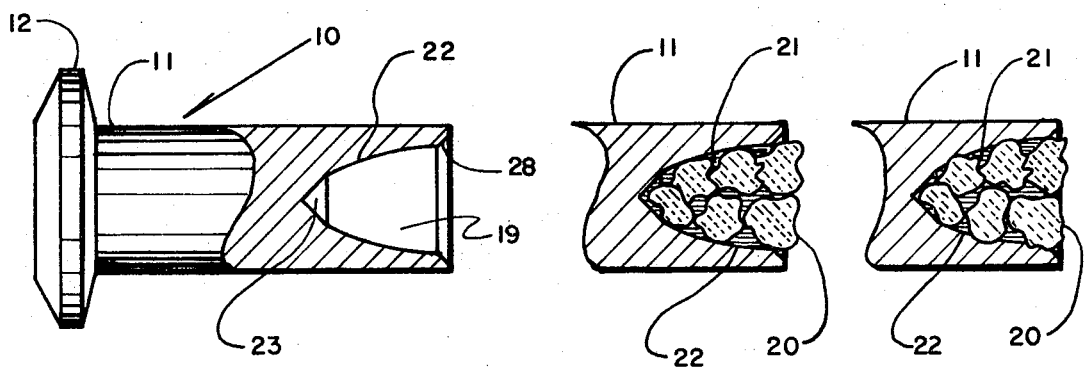

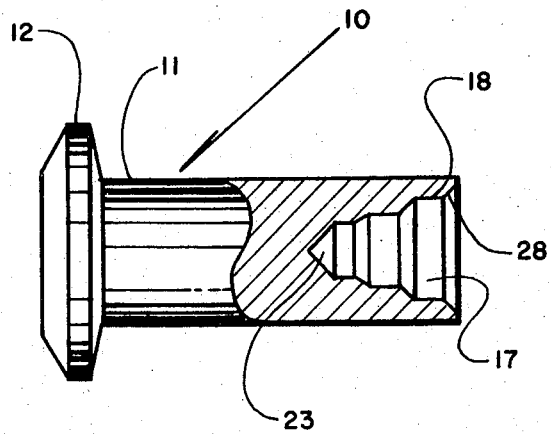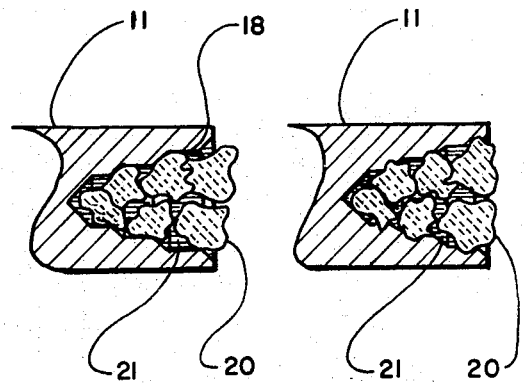
Fig. 10   Fig. 11   Fig. 12
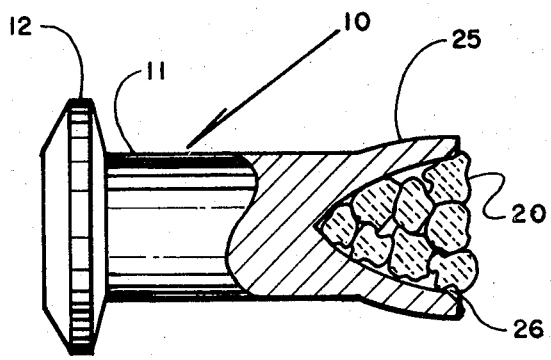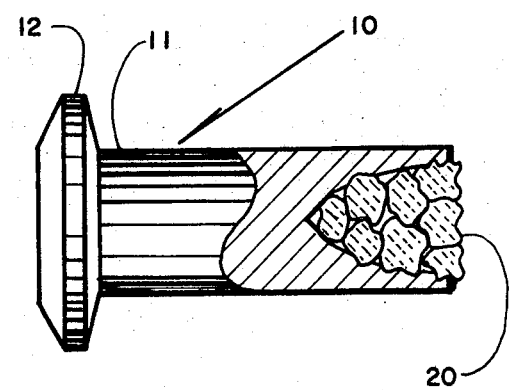
Fig. 13   Fig. 14

3,717,189
METHOD AND APPARATUS FOR TIRE STUDS
Charles E. Gutshall, Ellwood City, Pa., assignor to
Textron, Inc., Providence, R.I.
Filed Mar. 2, 1971, Ser. No. 120,223
Int. Cl. B60c 11/16
U.S. Cl. 152—210
9 Claims

ABSTRACT OF THE DISCLOSURE

The tire stud includes a cylindrical casing having an enlarged head at one end and a substantially conical-like shaped blind bore extending inward from the other end. The largest cross-section of the bore is at the terminus of the casing. The bore is filled with a particulate ceramic abrasive and a matrix which bonds the bore materials therein. By bell mouthing the casing and then reducing the effective diameter thereof after filling the bore with the particles, a stud which mechanically retains the particles within the bore is produced.

My invention is directed to tire studs and, more particularly, to tire studs having a conical-like shaped blind bore filled with particulate ceramic abrasives. The standard tire stud includes a headed metallic casing and a silicon or tungsten carbide insert which is placed in a bore in the casing. The carbide insert is approximately one-half the stud casing diameter and protrudes from the tire surface about one-tenth of an inch. The carbide insert is normally held in place by friction through a push fit. The carbide insert is employed since most driving is done on clear, dry roads which would rapidly wear down a stud of complete steel to lengths too short to protrude from the tire. This standard stud results in pavement destruction because of the penetrative feature of the very hard, point-shaped, carbide insert.

My tire stud minimizes the destructive features of the standard tire stud. This is accomplished by increasing the area contact with the pavement to distribute the load and forces. This increased area, without increased mass or weight, eliminates the sharp point road surface penetration and permits reduction of the protrusion from the tire. As my tire stud wears, the area of contact becomes more stabilized since it is the pavement itself which shapes the exact contour of the end of the stud. In addition, my tire stud aids in the ultimate removal of shock at impact, both by the nature of the form of the ceramic abrasive and by the nature of the casing itself. In addition, my tire stud can be made in a novel way to provide a mechanical bond for the particulate ceramic abrasive within the bore.

My invention is a tire stud in which a blind bore extends inward from the casing end and is substantially conical-like in shape. The open end of the bore is chamfered radially outward and a ceramic abrasive in particle form fills the bore and is held therein by a matrix or a mechanical bond.

In the accompanying drawings, I have shown my presently preferred embodiments of my invention in which:

FIG. 1 is partly in section and shows a conical blind bore;

FIG. 2 shows the stud of FIG. 1 before use;

FIG. 3 shows the stud of FIG. 1 after use;

FIG. 4 is partly in section and shows a conical-like stepped curved wall blind bore;

FIG. 5 is the stud of FIG. 4 before use;

FIG. 6 is the stud of FIG. 4 after use;

FIG. 7 is partly in section and shows a conical-like curved wall blind bore;

FIG. 8 is the stud of FIG. 7 before use;

FIG. 9 is the stud of FIG. 7 after use;

FIG. 10 is partly in section and shows a conical-like stepped straight wall blind bore;

FIG. 11 is the stud of FIG. 10 before use;

FIG. 12 is the stud of FIG. 10 after use;

FIG. 13 is partly in section and shows a bell mouthed stud during processing; and FIG. 14 shows the stud of FIG. 13 after processing.

My tire stud, generally designated 10, includes a cylindrical casing, generally designated 11, of a metal such as steel which has an enlarged head, generally designated 12, at one end thereof. The head 12 can be of any of the standard configurations for push fitting into a hole in a tire tread and the particular configuration of the head 12 does not form a part of this invention. The casing 11 includes a blind bore at the end opposing the head 12. The blind bores of the various embodiments of my invention have a number of different shapes but since all of them approach being a cone, the blind bore, when referred to generically, will hereinafter be referred to as a conical-like shaped blind bore. Ceramic abrasive particles 11 such as tungsten carbide, other carbides or other sufficiently hard ceramic abrasives fill the blind bore. The particles may be held in the bore mechanically or by a matrix. The matrix can be metallic, an epoxy, a glue or other suitable bonding agent.

In FIG. 1, the bore 13 is conical-shaped, substantially along the length thereof, being defined by straight wall 14. Bore 13 terminates within the casing as cone 23 of relatively small dimension. This small cone 23 results from normal processing techniques. The bore 13 will extend into the casing a depth at least compatible with legal protrusion standards and acceptable tire tread wear. The outer or larger end of the bore 13 terminates in an increased cross-section as the result of the radially outward chamfer 28 in the casing wall. This chamfer 28 aids in the filling of the bore with the carbide particles and helps channel the particles 11 toward the central portion of the bore rather than being torn away as in a sudden acceleration.

The conical-like shaped blind bore can also be of a stepped wall construction, see FIGS. 4 and 10. The bore 15 of FIG. 4 has a stepped wall with the wall portions 16 between the steps being convexly curved. The stepped wall may also be straight as shown in FIG. 10 where the bore 17 has a stepped wall in which the wall portions 18 between the steps are straight and parallel to the longitudinal axes of the stud 10. In certain applications it is desirable to minimize the wall thickness of the casing and, therefore, a bore 19 having a convexly curved wall 22 is employed, see FIG. 7.

These various conical-like shaped blind bores are then filled with the particles 20. These particles 20 are held in in the various blind bores by any of the aforementioned bonding agents. For example, a metallic matrix 21 such as that formed by a molten copper alloy which solidifies in situ to bond the carbide particles 20 within the matrix and to bond the matrix to the casing 11 can be employed.

I have found that there are certain critical features which can be controlled to maximize the efficiency of my tire stud. Since the larger the contact area of the carbide matrix, the less the point-like penetrating effect will be, the bore should be as large as possible at the open end of the casing 11. I have found that the cross-sectional area of the casing wall at the open end of the casing, but excluding the chamfer 28, can be up to 55 percent of the cross-sectional area of the bore along the same plane. In other words, the end of the bore, excluding the chamfered area, has a cross-sectional area of a minimum of 45 percent of the cross-sectional area of the casing wall.

The particle size is also critical and I have found that a particle size passing through a number 6 mesh and retained on a number 30 mesh should be employed with a preferred particle size passing through a number 8 mesh and being retained on a number 16 mesh. Where mechanical bonding is employed, a larger particle size can be successfully utilized.

The manner of operation and the general purpose for the various shaped bores is explained as follows. After manufacture and before use, the conical cavity 13, see FIG. 1, is filled with the carbide particles 20 and the metal matrix 21 so the particles 20 slightly protrude from the end of the casing, see FIG. 2. However, after driving a short distance, the carbide particles are leveled off and stabilized as a result of the impact from the road and have become embedded in the inside wall 14 of the cavity as forces dictate, see FIG. 3. Since the walls of the casing are as thin as possible, these thin walls may be dilated or even bell mouthed by the cramming effect of the leveling off.

Where high speed driving will be employed, the curved stepped wall construction of FIG. 4 is beneficial since the leveling off described above is in degrees with secondary resistance being offered along the various steps. Again after manufacture, the carbide particles 20 extend beyond the end of the casing, see FIG. 5, but after use they are forced inward by the impact with the road, see FIG. 6.

To maximize the leveling off of the carbide, such as would be ideal for slow moving vehicles, a very thin casing wall is employed, see FIG. 7. Because of the convex curvature of the wall 22, this stud will level quickly and bell mouth rapidly. As can be seen in FIG. 8, the carbide particles 20 extend out of the cavity prior to use, and are forced into the cavity after impact, see FIG. 9. Because of the thinness of the wall 22, the wall 22 will actually deform. This deformation can be controlled by using an alloyed steel casing tempered to the appropriate hardness.

The combination of fast leveling off and secondary resistance to excessive flattening caused by sudden bursts of speed is taken care of by the straight stepped wall construction of FIG. 10. The before use and leveling off and flattening out after use is shown in FIGS. 11 and 12, respectively.

The same basic concepts described hereinabove can be achieved through a novel method of manufacture. Normally the bore is filled with the carbide particles and the molten metal poured therein or vice versa and allowed to solidify in situ. However, in accordance with my invention the tire stud is designed with a substantially bell mouthed casing wall 25 having a hyperbolic or parabolic shaped bore 26, which is hereinafter referred to as convexly curved, see FIG. 13. Bell mouthed casing wall 25 extends a substantial distance of the bore 26 and because of the bell mouthed shape the diameter along the bell mouthed wall 25 is greater than the diameter of the remainder of the casing 11. Loose carbide particles 20 are then placed into the cavity and the bell mouthed wall 25 is then closed to the corresponding diameter of the remainder of the casing 11. This reduction in diameter can be accomplished by drawing or swaging. The effect of this reduction in diameter is to entrap the particles 20 within the bore 26 and to mechanically retain them therein, see FIG. 14. The resultant stud may for some applications be used as is or may subsequently be heat treated and/or hot dipped in galvanize to fill the interstices between the various particles within the core with molten zinc to strengthen the retention of the particles 20 within the bore 26.

I claim:
1. A tire stud comprising:
    (A) a cylindrical casing terminating in an enlarged head at a first end, said casing including a blind bore having a substantially conical-like shape along the length thereof and extending inward from a second end thereof, the bore being smaller at its blind end than at the second end;
    (B) a plurality of ceramic abrasive particles positioned within said bore; and
    (C) a matrix within said bore bonded to the casing and retaining the particles therein.
2. The tire stud of claim 1 wherein the casing wall defining the blind bore terminates at the second end in a chamfered surface extending radially outward from the bore.
3. The tire stud of claim 1 wherein the wall which defines the bore is step-like with the wall portions between the steps being convexly curved.
4. The tire stud of claim 1 wherein the wall which defines the bore is step-like, with the wall portions between the steps being straight and substantially parallel to a central longitudinal axis of the tire stud.
5. The tire stud of claim 1 wherein the casing wall defining the blind bore is convexly curved to minimize the casing wall thickness.
6. The tire stud of claim 1 wherein the cross-sectional area of the casing wall at the second end is a maximum of 55 percent of the cross-sectional area of the bore through the same cross-section.
7. The tire stud of claim 1 wherein the ceramic abrasive has a particle size which passes a number 6 mesh and is retained on a number 30 mesh.
8. The tire stud of claim 1 wherein the matrix is a metal.
9. The tire stud of claim 7 wherein the particle passes a number 8 mesh and is retained on a number 16 mesh.

References Cited

UNITED STATES PATENTS

| 3,196,921 | 7/1965 | Hakka | 152—210 |
| 952,014 | 3/1910 | Morris | 152—210 |

FOREIGN PATENTS

| 21,909 | 9/1913 | Great Britain | 152—210 |

JAMES B. MARBERT, Primary Examiner